Patented Mar. 1, 1949

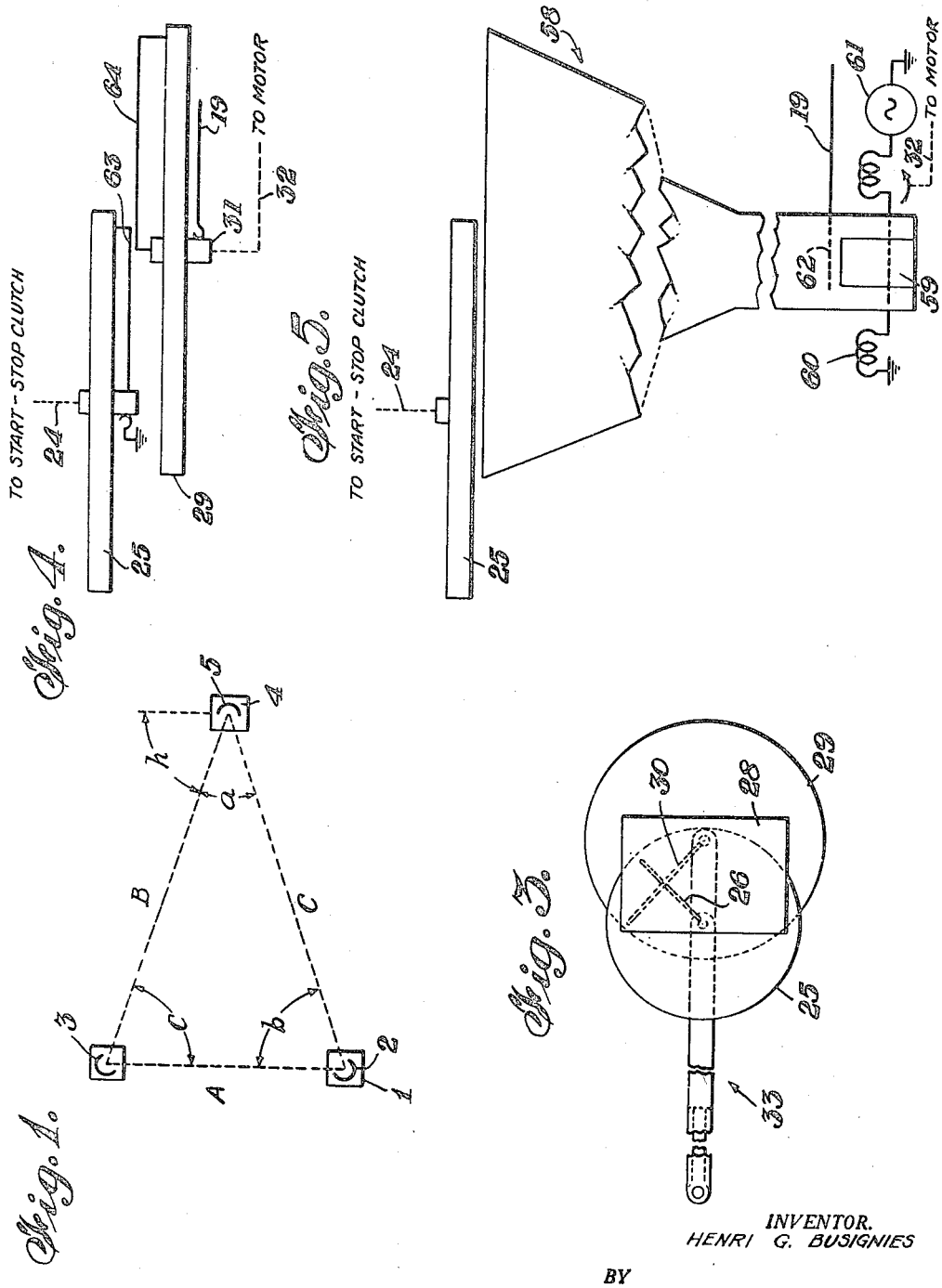

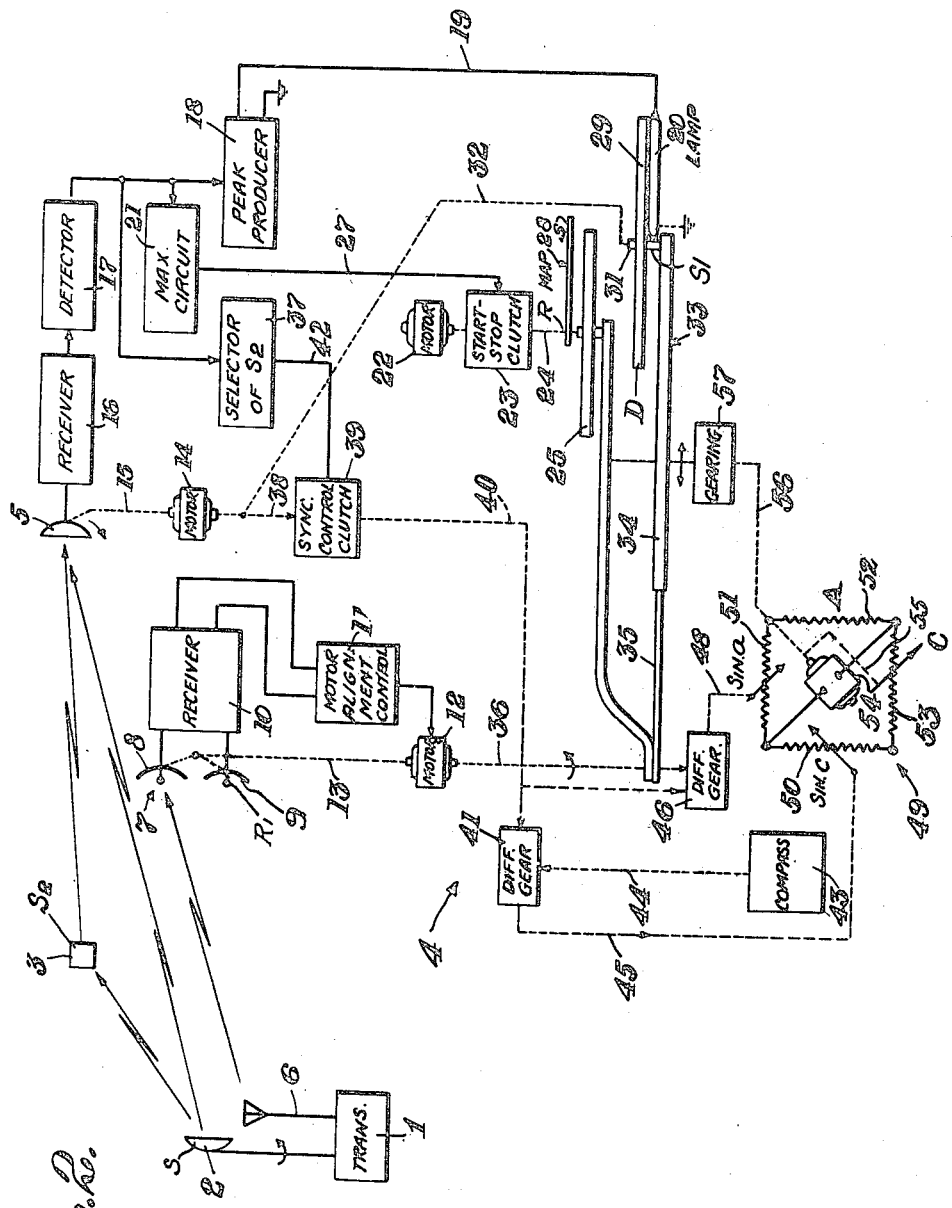

2,463,476

UNITED STATES PATENT OFFICE 2,463,476

RADIO NAVIGATION SYSTEM

Henri G. Busignies, Forest Hills, N. Y., assignor to Federal Telephone and Radio Corporation, New York, N. Y., a corporation of Delaware Application September 26, 1945, Serial No. 618,771

13 Claims. (Cl. 343—112)

This invention relates to radio navigation systems and more particularly to radio beacon systems of the radio lighthouse type.

Systems have previously been proposed for providing relatively complete navigational information to a plurality of craft approaching a station indicating the position of the craft with respect to the lighthouse or beacon transmitter and the location of other craft or reradiating objects in the vicinity thereof. Such systems generally have provided cathode ray type tube indicators similar to those used in regular radar equipment. A system of this general type is illustrated, for example, in my copending application, Serial No. 579,568, filed February 24, 1945. In some cases, however, it is desirable to provide indications as to position of a craft with respect to a transmitting station and a display of this position together with that of other reradiating objects in the vicinity without the necessity of using a cathode ray tube indicator and special sweep circuits.

It is accordingly an object of my invention to provide a position indicating system for indicating the location of reradiating objects without the use of cathode ray tube indicators.

It is a further object of my invention to provide a position indicating system for use with a radio lighthouse wherein the position of receiver and reradiating objects in the vicinity of said receiver may be provided by the use of substantially pure electromechanical means.

It is a still further object of my invention to provide an indicating system for indicating the location of reradiating objects in response to energy reradiated therefrom under control of a radio lighthouse transmitter in which the position of the reradiating objects is indicated by means of the intersection of two radial indicating means.

According to a feature of my invention, I may provide a radio lighthouse station which preferably includes a directional transmitting antenna rotated at a predetermined speed. In the vicinity of the radio lighthouse is preferably provided a reradiator which will serve to repeat the signal with a distinctive characteristic. On each craft utilizing the station is provided a means for directively receiving energy from different selected directions. Preferably, this directive means on the craft is rotated at a speed different from the speed of rotation of the radio lighthouse, for example at a rate fifty times higher. As an indicating instrument are provided two rotatable linear indicators which may, for example, comprise slots in opaque discs. These discs are mounted for rotation about axes spaced a distance apart representative of the spacing between the receiver and the radio lighthouse. One of the discs is rotated at the speed of rotation of the radio lighthouse directive equipment and the other disc is rotated at a speed of rotation of the directive receving equipment. The two linear indicators, therefore, will successively intersect at different points representative of a scanning over the entire area covered by the system. Whenever energy is received from the radio lighthouse or from some reradiating objects in the lighthouse field, means is provided to produce a visual indication of the intersection of the two linear indicators. This visual indication may, for example, be produced by a lamp lit in response to output energy from the receiver. The indication will appear in scale at the position of the reradiating object with respect to the receiver and radio lighthouse equipment. As many indications will be provided as there are reradiating objects in the field. Thus a visual indication of the position of all of these radiating objects will be provided which indication may be reproduced on a map or chart of the area.

When the receiver is arranged on a movable craft, it is necessary that the centers of rotation of the linear indicators be adjustably spaced apart variable distances representative of the spacing between the lighthouse and the receiver. This may be accomplished manually be adjusting the spacing until some reradiating object, fixed with respect to the lighthouse, appears at a marked place on the chart. However, in accordance with my invention, means may be provided automatically to correct the position of the centers of rotation in accordance with the distance of the receiver from the transmitter. Should the receiver be used in an installation fixed with respect to the radio lighthouse, then it will be unnecessary to make any adjustment for the difference in spacings of the receiver.

While, according to the features described above, the indicating system has been described principally as rotatable slotted discs, it is clear that other types of indicators may be provided. In place of one of the discs, for example, a cathode ray tube may be provided in which a radial line is rotated in synchronism with the receiver directive collector or the radio beacon lighthouse transmitter and caused to be illuminated whenever received energy is applied thereto. Furthermore, one or both of the discs may be made transparent and, instead of a slot, wires may be mounted on the two discs which will cross at different points. The output receiver voltage may be applied between these two wires so that in the event received signals are applied, a spark will be created which will produce a visible illumination.

While I have outlined above some of the objects and features of my invention, a better understanding of the invention and the objects and features thereof may be had from the particular description of an embodiment thereof and certain modifications made with reference to the accompanying drawings, in which:

Fig. 1 is a diagram used in explaining the general principles of my invention;

Fig. 2 is a schematic circuit diagram partly in block form illustrating a receiver equipment in accordance with my invention;

Fig. 3 is a plan elevational view of indicator equipment shown in Fig. 2;

Fig. 4 is a side elevational view of a modified type of equipment for use in the receiver system of Fig. 2; and Fig. 5 is a side elevational view of a still further modified form of indicator which may be used with the equipment such as illustrated in Fig. 2.

Turning first to Fig. 1, a radio lighthouse 1 having a directive rotatable antenna 2 is shown at one of the apices of a triangle, the sides of which are designated as A, B and C. At a different apex of the triangle is provided a reradiating station 3, the distance A between 1 and 3 being fixed. The receiver equipment is shown at the other apex of the triangle at 4. At the receiver is provided a rotatable directive antenna 5. The side C of the triangle intermediate the lighthouse 1 and the receiver 4 represents the distance of the received from the lighthouse and the side B of the triangle represents the distance of receiver 4 from the reradiating object 3. Angles a, b and c may be readily determined from the directive energy received at 4. The side A of the triangle is already known and it may be assumed for simplicity of calculation that reradiator 3 is arranged at a fixed direction such as true north from the lighthouse 1. However, at the receiving equipment 4 there may be provided also a compass which will enable this direction to be indicated so that the angle h may be derived and from it the angle c may be easily produced. To determine the distance C then, there may be utilized the relation according to the equation $$C = A \frac{\sin c}{\sin a}$$

which may be reduced to the form $$\frac{C}{A} = \frac{\sin c}{\sin a}$$

This equation is useful in determining the position of receiver 4 with respect to lighthouse radiator 1 as will be clear in the further specific description of the apparatus.

A more complete explanation of the operation of the system is made in connection with the showing of Fig. 2. In this figure, the transmitter 1 is shown as being provided with an additional omnidirectional antenna 6 as well as antenna 2. Antenna 6 may, if desired, transmit energy at a slightly different radio frequency from antenna 2. The energy radiated from antenna 2 may be designated as S while that reradiated from 3 is designated S2. The receiver equipment 4, in addition to antenna 5, includes a directive antenna 7 comprising two parts 8 and 9. The two antenna parts 8 and 9 are coupled to a receiver 10, the output of which is applied to a motor alignment control apparatus 11 which serves to control the rotary position of a motor 12. Motor 12 through the medium of shaft 13 serves to maintain antenna 7 continuously in alignment with transmitter station 1 in response to the energy transmitted from antenna 6. Thus, the shaft 13 of motor 12 will, at all times, correspond in angular position with the line C, Fig. 1. Each time antennas 5 and 2 are aligned with each other, a maximum directly received energy signal from antenna 2 will be received. Antenna 5 is rotated continuously by motor 14 operating over shaft 15 preferably at a higher rate of speed than antenna 2 is rotated. When antenna 5 is aligned with reradiating object 3, it will receive energy reradiated from object 3 under the initiation of energy from antenna 2. This reception of energy at antenna 5 will take place only when antenna 2 is aligned with reradiator 3 in a direction corresponding to line A of Fig. 1. When antenna 2 is aligned with other reradiating objects in the field of the radio lighthouse, energy will also be received in antenna 5 when this antenna 5 is also aligned therewith. The directly received and the received reradiated energy is applied from antenna 5 to a receiver 16 and from 16 to detector 17 which serves to produce output energy having an envelope characterized by the amplitude variations of the received energy. The output of detector 17 is passed through a peak producing circuit 18 and over line 19 to a lamp 20 so that lamp 20 will be illuminated each time energy directly from transmitter 1 or reradiated from any object is received in the receiver.

Output energy from detector 17 is also applied to maximizing circuit 21 which serves to select only the maximum peak energy which is received when antennas 2 and 5 are aligned with one another. This maximum will occur once for each revolution of antenna 2. A motor 22 is provided which rotates at a speed slightly greater than the rotary speed of antenna 2. This speed, however, is adjusted so as to be very nearly the same speed of rotation as antenna 2. Motor 22 is coupled through a start-stop clutch 23 and shaft 24 to a slotted rotary disc 25. In disc 25, radial slot 26 is provided as can be seen by reference to Fig. 3. The start-stop clutch 23 is controlled from the output of maximizing circuit 21 over line 27 so that it will serve to stop the rotation of disc 25 once for each revolution to maintain the disc rotation in substantial synchronism with rotary antenna 2. Shaft 24 is positioned relative to a map 28 in a position corresponding to the location of transmitter 1 in the area. A second slotted disc 29 provided with a radial slot 30 is mounted for rotation about an axis 31 corresponding in position to the position of the receiver equipment with respect to the transmitter on map 28. Disc 29 is rotated in synchronism with antenna 5 by means of a shaft 32 driven by motor 14. The discs 25 and 29 are mounted in overlapping relationship so that as these discs rotate at their respective speeds, slots 26 and 30 will have successive intersections corresponding to separate scanning positions over the area of map 28. Since the spacing apart of the axes of rotation of these slots corresponds to the spacing of the transmitter and the receiver in the actual position, the intersection points along the map will be indicated in relative position with respect to these two stations corresponding to actual positions on the ground.

Lamp 20 is mounted directly below slot 30 of disc 29 and when it becomes illuminated, a spot will appear on the map corresponding to the intersection point of the slots at the moment the signal is received. Thus, the spots successively produced on the chart will correspond in position to the position of reradiating objects in the vicinity of the system.

If the receiver apparatus 4 is mounted in a fixed position relative to transmitter 1, then no provision for adjustment of the spacing between shaft 24 and bearing 31 need be provided. However, it is generally desirable to have the receiver mounted on a movable craft. In such a case it is necessary to provide a means for adjusting the spacing between 24 and 31 to the proper relationship corresponding to the changing position of the receiver with respect to the transmitting apparatus. Accordingly, the rotatable disc 29 is mounted on an arm 33 which may be composed of two telescoping sections 34 and 35 so that adjustment as to distance may be made. Arm 33 is also controlled by alignment control motor 12 over shaft 36 so as always to be maintained in the proper aligned position with respect to line C, Fig. 1. The entire indicating equipment including disc 25, map 28 and disc 29 is mounted to rotate with arm 33. The distance or spacing adjustment between 24 and 31 may, if desired, be accomplished manually by changing this spacing until some known reflecting object shown on the chart and the corresponding indication produced by the intersection of the slots coincide.

In some cases, however, it is desirable that the spacing be automatically controlled so that the map position and the spacing of the various elements will at times correspond substantially to the actual position in space. For this purpose it is necessary to provide a mechanism which will substantially solve the equation for calculating C according to the formula $$\frac{C}{A} = \frac{\sin c}{\sin a}$$

To accomplish this, means is provided in the form of a selector circuit 37 for selecting this particularly characterized signal from reradiating object 3. An additional shaft 38 coupled to motor 14 through the synchronizing control clutch 39 and further shaft 40 is coupled to differential gearing mechanism 41. The synchronizing control clutch 39 is controlled by output energy from selector circuit 37 as indicated by line 42. This synchronizing control clutch then is positioned in response to energy S2 from reradiator 3 so as to maintain shaft 40 displaced from shaft 38 in accordance with the direction of line B. Thus, shaft 40 may be considered as representing the line B. A compass 43 is also coupled over shaft 44, having an alignment with the known angular line of side A, to differential gear 41 so that the output shaft 45 from differential gearing 41 corresponds to angle $h$, Fig. 1, which is equal to angle $c$. A further differential gear 46 is coupled with shaft 36 and with shaft 40 providing a drive for the output shaft 48 representing the angle $a$, that is, 36 represents direction line C and 40 represents direction line B. A bridge network 49 having resistance arms 50 and 51 variable corresponding to sine $c$ and sine $a$ respectively, a fixed resistance arm 53 corresponding to the fixed distance A and a variable resistance arm 52 corresponding to the variable distance C is provided. Resistors 50 and 51 operate under control of shafts 45 and 48 respectively, to adjust these bridge arm resistances to correspond to sine $c$ and sine $a$ respectively. The follow-up motor 54 is diagonally coupled across bridge 49 between the junction points of arms 50 and 51 and arms 52 and 53. Whenever the bridge 49 is unbalanced by movement of either 50 or 51 or both, motor 54 is energized in the proper sense to rotate driving shaft 55 which will adjust arm 52 to rebalance the bridge. Since adjustment of arm 52 to the rebalancing position corresponds to an adjustment equal to distance C, the position of the output shaft 55 of motor 54 will at all times correspond to this distance. Thus, if the motor is coupled over shaft 56 and gearing mechanism 57 to the telescoping sections 34 and 35 of arm 33, the length of this arm may be controlled in accordance with the distance C so as to maintain properly the spacing between shaft 24 and axis 31.

It will thus be seen that with this mechanism the equipment at the receiver may be made wholly automatic so that positions of various reradiating objects will be shown on map 28 in their relative positions. It will be clear that other forms of mechanical or electrical computation apparatus may be provided, if desired, to secure substantially the same results.

While in Fig. 2 I have illustrated a simple form of indicator comprised of opaque slotted discs, other types of linear indicating devices which will intersect at various points in a similar manner may be readily provided. For example, in Fig. 5, disc 25 is provided in the same manner as in Fig. 2. However, in place of the disc 29, I provide a cathode ray tube 58. Tube 58 is provided with an electron gun apparatus 59 and deflecting apparatus such as coils 60 which are driven by shaft 32 from a motor such as 14 in synchronism with the rotatable antenna. An alternating current source 61 is provided coupled to coils 60 so as to provide a radial deflection of the beam simultaneous with the angular positioning thereof. The output line 19 of the receiver may be coupled to a control grid 62 in cathode ray tube 58 so that the electron beam can produce an illuminated line on the screen of the tube only in response to the received signal energy. Thus the cathode ray tube will effectively provide a rotatable line similar to that produced by disc 29 and lamp 20 of Fig. 2.

In Fig. 4 is shown a still further alternative arrangement of indicator apparatus. In this arrangement, discs 25 and 29 are made of transparent material. These discs are rotated in the same relative manner by shafts 24 and 32 as are the discs shown in Fig. 2. However, in place of the radial slots, linear conductor wires 63, 64 are provided. The output potential from peak producing circuit 18 is applied between wires 63 and 64 so that upon receipt of energy, a spark will be produced between wires 63 and 64 at their point of intersection to produce an illumination of the map. Line 19 may be coupled, for example, to line 64 and line 63 coupled to ground so that the output potential from the peak producing circuit will be provided between the wires 63 and 64.

It will be clear that many other forms of rotary linear indicators may be provided in place of the several modifications illustrated. Furthermore, the principles of my invention may be applied to other types of radio lighthouse systems such as illustrated, for example, in my copending application, Serial No. 579,568, referred to above. It will be further observed that in accordance with the system herein described the energy transmitted from the radio lighthouse 1 may be in any form, for example continuous waves, as well as in the form of pulses or the like. Furthermore, it will be clear to those skilled in the art that if desired the self-aligning receiver equipment shown at 10 in Fig. 2 need not be provided but the energy directly received in antenna 5 may be used to produce the directive indications of the lighthouse system by suitable redesign of the circuits.

It should be distinctly understood that particular modifications described herein are given merely as an illustration of my invention and not as any limitation on the scope of my invention as set forth in the objects hereof and in the appended claims.

I claim:

1. An indicating receiver system for producing position indications of reradiating objects in the moving beam field of a radiator comprising two linear indicators each mounted on a shaft for movement, said shafts being spaced proportionally to the length of line from said receiver system to said radiator and enabling the indicators to intersect at a point, and directive moving means under the joint control of the beam energy received from said radiator and a reradicating object when in alignment therewith for causing said indicators to move and produce an intersection point corresponding to the position of said reradiating object with respect to said line.

2. An indicating receiver system for producing position indications of reradiating objects in response to reradiated energy initiated at a directive radiator angularly moved at a given speed; comprising an angularly movable directive antenna for receiving energy from said directive radiator and said reradiated energy, a receiver coupled to said antenna, a pair of linear indicating devices mounted for movement about axes spaced apart a distance corresponding to the spacing between said receiver system and said directive radiator, means for angularly moving one of said devices in synchronism with said directive radiator and the other device in synchronism with said directive receiving antenna, whereby intersections of said devices correspond to successive azimuth and distance positions with respect to said receiver, and means for producing a visible indication at the intersection of said devices in response to said received energy whereby the positions of said reradiating objects are indicated.

3. An indicating receiver system for producing position indications of reradiating objects in response to reradiated energy initiated from a directive radiator rotated at a given speed; comprising a rotatable directive antenna for receiving energy from said directive radiator and said reradiated energy, a receiver coupled to said antenna, a pair of discs provided with linear indicating means mounted for rotation about axes spaced apart a distance corresponding to the spacing between said receiver system and said directive radiator, means for rotating one of said discs in synchronism with said directive radiator and the other disc in synchronism with said directive receiving antenna, whereby intersections of said indicating means correspond to successive azimuth and distance positions with respect to said receiver, and means for producing an illumination at the intersection of said indicating means in response to said received energy whereby the positions of said reradiating objects are indicated.

4. An indicating receiver system for producing position indications of reradiating objects in response to reradiated energy from a directive radiator rotated at a given speed; comprising a rotatable directive antenna for receiving energy from said directive radiator and said reradiated energy, a receiver coupled to said antenna, a pair of opaque discs, provided with radial slots, mounted for rotation about axes spaced apart a distance corresponding to the spacing between said receiver system and said directive radiator, means for rotating one of said discs in synchronism with said directive radiator and the other disc in synchronism with said directive receiving antenna, whereby intersections of said slots correspond to successive azimuth and distance positions with respect to said receiver, and means mounted along one of said slots for producing an illumination in response to said received energy whereby the positions of said reradiating objects are indicated.

5. An indicating receiver system for producing position indications of reradiating objects in response to reradiated energy initiated from a directive radiator rotated at a given speed; comprising a rotatable directive antenna for receiving energy from said directive radiator and said reradiated energy, a receiver coupled to said antenna, a pair of linear indicating devices mounted for rotation about axes spaced apart a distance, means for adjusting said distance to correspond to the spacing between said receiver system and said directive radiator, means for rotating one of said devices in synchronism with said directive radiator and the other device in synchronism with said directive receiving antenna, whereby intersections of said devices correspond to successive azimuth and distance positions with respect to said receiver, and means for producing an illumination at the intersection of said devices in response to said received energy whereby the positions of said reradiating objects are indicated.

6. An indicating receiver system for producing position indications of reradiating objects in response to reradiated energy initiated from a directive radiator rotated at a given speed; comprising a rotatable directive antenna for receiving energy from said directive radiator and said reradiated energy, a receiver coupled to said antenna, a pair of transparent discs mounted for rotation in overlapping relation about axes spaced apart a distance corresponding to the spacing between said receiver system and said directive radiator, linear wires mounted radially of each disc on the surfaces facing one another, means for rotating one of said discs in synchronism with said directive radiator and the other disc in synchronism with said directive receiving antenna, whereby intersections of said wires correspond to successive azimuth and distance positions with respect to said receiver, and means for applying the received energy between said wires to produce a spark at the intersection of said wires whereby the positions of said reradiating objects are indicated.

7. An indicating receiver system for producing a position indication of the receiver in response to energy initiated from a directive radiator rotated at a given speed; comprising a rotatable directive antenna for receiving energy from said directive radiator and said reradiated energy, a receiver coupled to said antenna, a pair of linear indicating devices mounted for rotation in overlapping relation about axes spaced apart a predetermined distance, a translucent chart mounted above said discs, means for adjusting said distance to correspond to the spacing between said receiver system and said directive radiator, means for rotating one of said devices in synchronism with said directive radiator and the other device in synchronism with said directive receiving antenna, where intersections of said devices correspond to successive azimuth and distance positions with respect to said receiver, and means for producing an illumination of said chart at a point above the intersection of said devices in response to said received energy whereby the positions of said reradiating objects are indicated.

8. An indicating receiver system for producing position indications of reradiating objects in response to reradiated energy from a directive radiator rotated at a given speed comprising a rotatable directive antenna for receiving energy from said directive radiator and said reradiated energy, a receiver coupled to said antenna, a pair of disc devices mounted for rotation in overlapped relation about axes spaced apart a distance corresponding to the spacing between said receiver system and said directive radiator, linear indicating means radially arranged on said discs, a transluscent chart mounted above said discs, means for rotating one of said discs in synchronism with said directive radiator and the other disc in synchronism with said directive receiving antenna, whereby intersections of said linear indicating means correspond to successive azimuth and distance positions with respect to said receiver, and means for producing an illumination at the intersection of said indicating means in response to said received energy whereby the positions of said reradiating objects are indicated.

9. An indicating receiver system for producing position indications of reradiating objects in response to reradiated energy initiated at a directive radiator rotated at a given speed, comprising a rotatable directive antenna for receiving energy from said directive radiator and other reradiated energy, means for rotating said directive receiving antenna at a predetermined speed different from said given speed, a first rotatably mounted disc, provided with a linear radial indicator mounted at a predetermined position representing said directive radiator, a second rotatable disc mounted in overlapping relationship to said first disc at a predetermined position representing said receiver position, said second disc being provided with a radial indicator, means coupled to said receiving antenna for receiving the signal applied thereto, means responsive to the maximum received energy from said rotatable radiator for maintaining said first-named disc in rotation in synchronism with said rotatable directive radiator, means for rotating said second disc in synchronism with said rotatable directive receiving antenna, means responsive to each received signal impulse to produce illumination at the intersection of said radial devices for each received signal, and a transluscent map simulating the area adjacent said directive transmitter arranged above said discs.

10. An indicating receiver system for producing position indications of reradiating objects in response to reradiated energy initiated at a directive radiator, rotated at a given speed and cooperating with a fixed reradiator arranged at a predetermined position with respect to said directive radiator, comprising a rotatable directive antenna for receiving energy from said directive radiator, said positioned reradiator and other reradiated energy, means for rotating said directive receiving antenna at a predetermined speed different from said given speed, a first rotatably mounted disc, provided with a linear radial indicator mounted at a predetermined position representing said directive radiator a rotatable arm, a second rotatable disc mounted on said rotatable arm in overlapping relationship to said first disc, said second disc being provided with a radial indicator, means for continuously maintaining said arm continuously in alignment with the line between said receiver and said radiator, means coupled to said receiving antenna for receiving the signal applied thereto, means responsive to maximum energy from said rotatable radiator for maintaining said first-named disc in rotation in synchronism with said rotatable directive radiator, means for rotating said second disc in synchronism with said rotatable directive receiving antenna, means responsive to each received signal impulse to produce illumination at the intersection of said radial devices for each received signal, a transluscent map simulating the area adjacent said directive transmitter arranged above said discs, and means for adjustably controlling the length of said arm to produce a spacing between the points of rotation of said first and second discs corresponding to the spacing between said directive transmitter and said receiver.

11. An indicating receiver system for producing position indications of reradiating objects in response to reradiated energy initiated at a directive radiator, rotated at a given speed and a reradiator at a predetermined position with respect to said directive rediator, comprising a rotatable directive antenna for receiving energy from said directive radiator, said positioned reradiator and other reradiating objects, means for rotating said directive receiving antenna at a predetermined speed different from said given speed, a first rotatable disc, provided with a linear radial slot, mounted at a predetermined position representing said directive radiator a rotatable arm, a second rotatable disc mounted on said rotatable arm in overlapping relationship to said first disc, said second disc being provided with a radial slot, means for maintaining said arm continuously in alignment with the line between said receiver and said radiator, means for selecting signals corresponding to the maximum energy from said rotatable radiator, a motor rotatable substantially at the speed of said rotatable receiving antenna coupled to said first-named disc, means under control of said maximum selecting circuits for maintaining said motor in synchronism with said rotatable directive radiator, means for rotating said second disc in synchronism with said rotatable directive receiving antenna, means arranged along the slot of said second disc for illuminating said slot in response to each received signal impulse whereby illumination will be produced at the intersection of said slots for each received signal, a map arranged above said discs simulating the area adjacent said directive transmitter, and means for adjustably controlling the length of said arm to produce a spacing between the points of rotation of said first and second discs corresponding the spacing between said directive transmitter and said receiver.

12. An indicating receiver system for producing position indications of reradiating objects in response to reradiated energy initiated at a directive radiator, rotated at a given speed and a fixed reradiator arranged at a predetermined spacing and positioned with respect to said directive radiator, comprising a rotatable directive antenna for receiving energy from said directive radiator, said positioned reradiator and other reradiating objects, means for rotating said directive receiving antenna at a predetermined speed different from said given speed, a first rotatable disc, provided with a linear radial slot, mounted at a predetermined position representing said directive radiator a rotatable arm, a second rotatable disc mounted on said rotatable arm in overlapping relationship to said first disc, said second disc being provided with a radial slot, means for continuously indicating the direction line between said receiver and said radiator, means for maintaining said arm continuously in alignment with said directive line, directive indicating means responsive to the earth's magnetic field, means coupled to said receiving antenna for receiving the signal applied thereto, means for selecting maximum signals corresponding to the energy received from said rotatable radiator, a motor rotatable substantially at the speed of said rotatable receiving antenna coupled to said first-named discs, means under control of said maximum selecting circuit for maintaining said motor in synchronism with said rotatable directive radiator, means for rotating said second disc in synchronism with said rotatable directive receiving antenna, means arranged along the slot of said second disc for illuminating said slot in response to each received signal impulse whereby illumination will be produced at the intersection of said slots for each received signal, a map arranged above said discs simulating an area including said directive transmitter, means for selecting signals from said reradiating device, means under control of said selected signals for providing a rotation synchronized in time with said rotatable receiving antenna but displaced angularly in accordance with the angle of said reradiating object, means under joint control of said last-named means, said magnetic direction indicating means and said means for continuously indicating direction for adjustably controlling the length of said arm to produce a spacing between the points of rotation of said first and second discs corresponding to the spacing between said directive transmitter and said receiver.

13. An indicating receiver system for producing position indications of reradiating objects in response to reradiated energy initiated at a directive radiator, rotated at a given speed and cooperating with an omnidirectional transmitter located adjacent said radiator, transmitting omnidirectional energy of a different character and a fixed reradiator for providing distinctive signals arranged at a predetermined spacing and positioned with respect to said directive radiator, comprising a rotatable directive receiving antenna for receiving energy from said directive radiator, said reradiator and energy from other reradiating objects, means for rotating said directive receiving antenna at a predetermined speed different from said given speed, a first rotatable disc, provided with a linear radial slot, mounted at a predetermined position representing said directive radiator a rotatable arm, a second rotatable disc mounted on said rotatable arm in overlapping relationship to said first disc, said second disc being provided with a radial slot, a second directive antenna for receiving energy from said omnidirectional radiator, means for maintaining said second directional antenna continuously aligned with said omnidirectional radiator, means for maintaining said arm continuously in alignment with the line indicated by said second directive antenna, direction indicating means responsive to the earth's magnetic field, means coupled to said first-named receiving antenna for receiving the signal applied thereto, means for selecting the signals corresponding to the maximum energy received from said rotatable radiator, a motor rotatable substantially at the speed of said rotatable receiving antenna coupled to said first-named disc, means under control of said maximum selecting circuit for maintaining said motor in synchronism with said rotatable directive radiator, means for rotating said second disc in synchronism with said rotatable directive receiving antenna, means arranged along the slot of said second disc for illuminating said slot in response to each received signal impulse whereby illumination will be produced at the intersection of said slots for each received signal, a map simulating an area including said directive transmitter arranged above said discs, means for selecting signals from said reradiating device, means under control of said selected signals for providing a rotation synchronized in time with said rotatable receiving antenna but displaced angularly in accordance with the angle of said reradiating object, means under joint control of said last-named means and said magnetic direction indicating means, and said means for maintaining said second receiver in alignment for adjustably controlling the length of said arm to produce a spacing between the centers of rotation of said first and second discs corresponding to the spacing between said directive transmitter and said receiver.

HENRI G. BUSIGNIES.

REFERENCES CITED

The following references are of record in the file of this patent:

UNITED STATES PATENTS

| Number | Name | Date |
|---|---|---|
| 2,171,561 | Hooven | Sept. 5, 1939 |
| 2,246,496 | Asbury | June 24, 1941 |
| 2,299,083 | Elm | Oct. 20, 1942 |
| 2,361,956 | Moseley | Nov. 7, 1944 |
| 2,408,048 | Deloraine et al. | Sept. 24, 1946 |